Patented Nov. 20, 1934

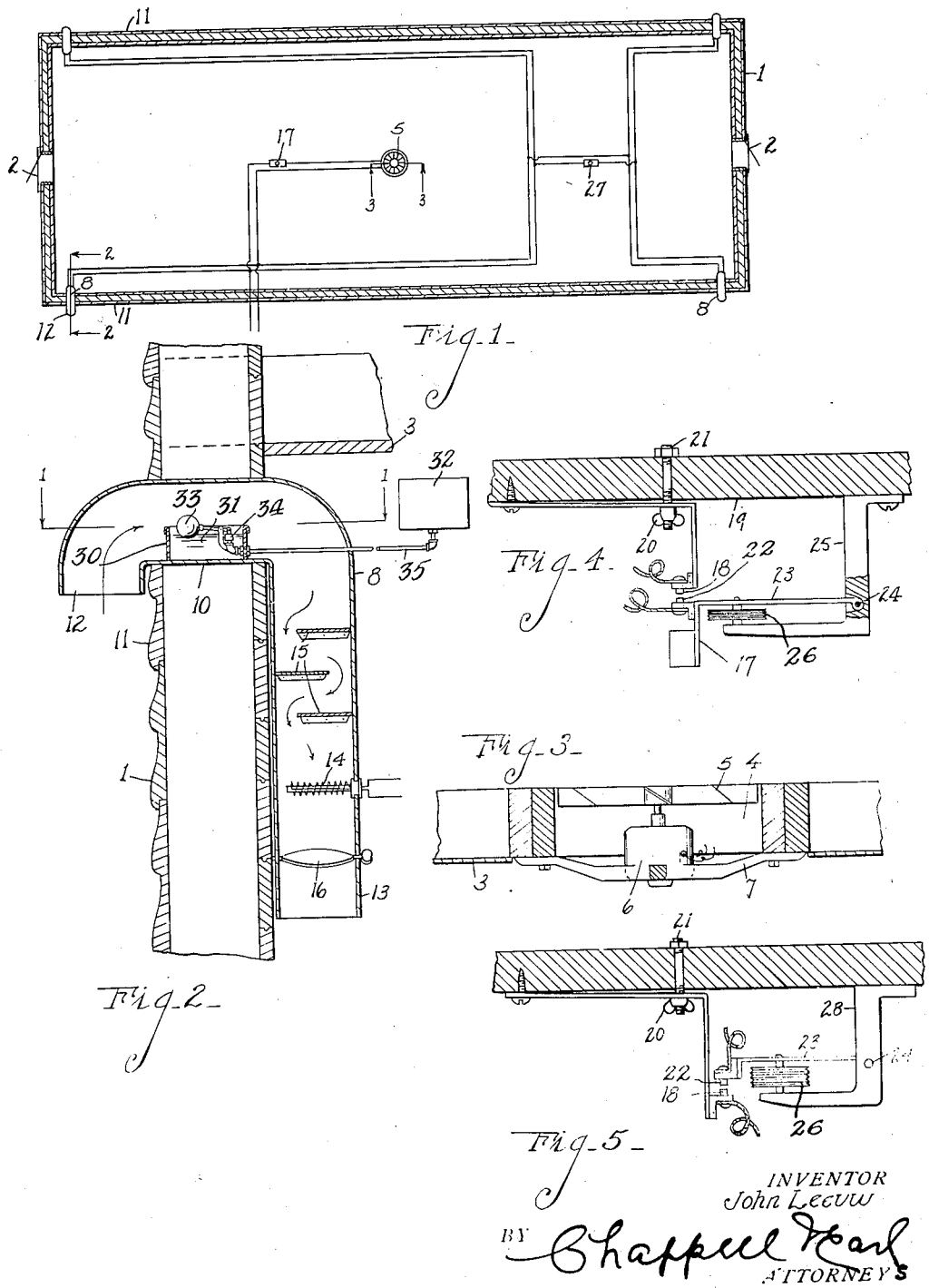

1,981,051

UNITED STATES PATENT OFFICE 1,981,051

VENTILATING SYSTEM

John Leeuw, Zeeland, Mich.

Application June 19, 1930, Serial No. 462,170

2 Claims. (Cl. 98—37)

The main object of my invention is to provide a ventilating system for brooder-houses and houses for raising fowls, or animals such as rabbits and the like, which is highly efficient in the uniform ventilation of all parts of the room and is effective in preventing the sudden lowering and raising of the temperature.

Objects pertaining to details and economies of my invention is clearly illustrated in the accompanying drawing in which:

Fig. 1 is a sectional and partial diagrammatic view of a building or room embodying my improvements, various parts being shown conventionally.

Fig. 2 is a fragmentary vertical section on line 2—2 of Fig. 1.

Fig. 3 is a fragmentary section on line 3—3 of Fig. 1.

Fig. 4 is a fragmentary view partially in section of the ventilating fan or blower thermostatic control switch.

Fig. 5 is a fragmentary view partially in section of the heating element control switch.

In the accompanying drawing I show my improvements as embodied in a one-room building, the walls of the building 1 being shown conventionally in Fig. 1. This building has a door 2 at each end. The ceiling 3 of the room is provided with a central ventilating opening 4 having a fan or blower 5 mounted in the opening and provided with a motor 6 carried by the spider or arms 7.

I provide an inlet conduit 8 for fresh air at each corner of the room. These conduits are angled and the arms 10 thereof are arranged through the side walls 11 of the room adjacent the ceiling thereof. The outer ends of the arms 10 are turned downwardly at 12 so that the incoming air passes upwardly into the conduit. The inner arms 13 of the conduits are disposed vertically and are of substantial length so that they deliver into the room at a point substantially spaced from the ceiling.

Within the conduits I mount electric heating elements 14. Above these heating elements I arrange a series of baffles 15 in alternating or staggered relation providing a zig-zag passage for the incoming air. Below the heating elements are dampers 16.

The conduits having their outer inlet ends directed downwardly and also being provided with baffles prevent direct blasts of air, that is, they prevent the passage of strong currents of air such as might be occasioned by high wind were these features not present.

The blower is controlled by a thermostatic switch designated generally by the numeral 17 in Fig. 1. This switch consists of the contact 18 adjustably mounted on the support 19, the adjustment being effected by the wing nut 20 on the bolt 21, see Fig. 4. A coacting contact 22 is carried by the switch member 23 pivoted at 24 on the angled hanger 25. This switch member is supported by the expansible thermostatic element 26 mounted on the arm of the support to coact with the switch member 23 so that when the temperature raises above a predetermined point the element 26 expands, closing the switch and starting the motor.

The heating elements 14 are all controlled from a common thermostatic element designated generally by the numeral 27 in Fig. 1, the parts of the switch being the same as in Fig. 4 except that the coacting contact 22 is modified so that it lies above the contact 18, and the expanding element 26 serves, upon expansion, to open the switch instead of closing it; that is, the switch is closed when the temperature falls, thereby supplying current to the heating elements.

The air intake conduit is provided with a humidifier for conditioning the fresh air. This comprises a pan 30 which is kept filled with water 31 from the reservoir 32 by the ball float 33 and needle valve 34 associated with the supply pipe 35.

My improved ventilating apparatus is especially designed by me for ventilation of rooms for brooding and raising fowls and for raising animals where uniform temperatures are to be desired and ventilation is an important feature.

My ventilating system is easily and economically installed and highly efficient. It should be understood that in rooms of substantial size I do not rely upon the heating elements 14 for the entire heating of the room, especially during low temperatures, these heating elements being designed to prevent the introduction of substantial volumes of cold air.

By my improved ventilating system the fresh air is very uniformly distributed throughout the room and very uniform temperatures may be maintained in and throughout the room.

In the accompanying drawing I have shown various parts mainly in conventional form, but it is believed that this disclosure will enable those skilled in the art to embody or adapt the same as may be desired.

Having thus described my invention what I claim as new and desire to secure by Letters Patent is:

1. In a ventilating system, the combination of a wall having a transverse opening, an air inlet conduit disposed in said opening and having a short downturned inlet and an elongated downturned outlet, a water pan disposed in the bottom of the portion of the conduit passing through said opening, a series of staggered baffles arranged in said outlet, an electric heater in said outlet below said baffles, and a control damper in said outlet below said heater.

2. In a ventilating system, the combination of a wall having a transverse opening, an air inlet conduit disposed in said opening and having a short downturned inlet and an elongated downturned outlet, a water pan disposed in the bottom of the portion of the conduit passing through said opening, a series of staggered baffles arranged in said outlet, and a heater in said outlet below said baffles.

JOHN LEEUW.